(12) United States Patent
Deutsch et al.

(10) Patent No.: US 12,164,548 B1
(45) Date of Patent: Dec. 10, 2024

(54) ADAPTIVE UI FOR RICH OUTPUT RENDERING OF ASSISTANT MESSAGES

(71) Applicant: OpenAi OPCo, LLC., San Francisco, CA (US)

(72) Inventors: Noah Deutsch, San Francisco, CA (US); Benjamin Zweig, San Francisco, CA (US)

(73) Assignee: OpenAi OPCo, LLC., San Francisco, CA (US)

( * ) Notice: Subject to any disclaimer, the term of this patent is extended or adjusted under 35 U.S.C. 154(b) by 0 days.

(21) Appl. No.: 18/606,435

(22) Filed: Mar. 15, 2024

Related U.S. Application Data

(60) Provisional application No. 63/555,462, filed on Feb. 20, 2024.

(51) Int. Cl.
| | | |
|---|---|---|
| *G06F 40/30* | (2020.01) | |
| *G06F 16/332* | (2019.01) | |
| *G06F 40/186* | (2020.01) | |
| *G06N 3/08* | (2023.01) | |

(52) U.S. Cl.
CPC ........ *G06F 16/3329* (2019.01); *G06F 40/186* (2020.01)

(58) Field of Classification Search
CPC .... G06F 40/211; G06F 40/253; G06F 40/268; G06F 40/284; G06F 40/30; G06F 16/00; G06F 16/144; G06F 16/148; G06F 16/156; G06N 3/08
See application file for complete search history.

(56) References Cited

U.S. PATENT DOCUMENTS

| | | | | |
|---|---|---|---|---|
| 7,840,648 | B1* | 11/2010 | Rosenstein | G06F 16/958 715/705 |
| 9,600,228 | B2* | 3/2017 | Gur | G06F 16/90332 |
| 10,546,001 | B1* | 1/2020 | Nguyen | G06F 40/186 |
| 11,099,705 | B1* | 8/2021 | Wittke | G06F 3/0481 |
| 11,604,794 | B1* | 3/2023 | Nallapati | G06F 16/24522 |
| 11,720,240 | B1* | 8/2023 | Setlur | G06F 16/3338 715/765 |
| 11,804,225 | B1* | 10/2023 | Agrawal | G10L 15/1815 |
| 11,847,133 | B1* | 12/2023 | Chan | G06T 11/206 |
| 11,908,463 | B1* | 2/2024 | Biswas | G10L 15/1815 |
| 11,960,517 | B2* | 4/2024 | Gupta | G06F 16/3344 |
| 2015/0067556 | A1* | 3/2015 | Tibrewal | G06F 16/2465 715/765 |
| 2015/0100588 | A1* | 4/2015 | Allen | G06F 16/243 707/748 |
| 2017/0068423 | A1* | 3/2017 | Napolitano | G06F 3/04842 |
| 2018/0176272 | A1* | 6/2018 | Zur | H10K 85/655 |
| 2018/0268025 | A1* | 9/2018 | Bandyopadhyay | G06F 16/2452 |
| 2018/0285337 | A1* | 10/2018 | Wagh | G06F 3/0485 |

(Continued)

*Primary Examiner* — Lamont M Spooner

(57) ABSTRACT

The present technology pertains to a generative response engine that can adapt a user interface provided by its front end to receive inputs in a visual format and to provide visual formats in response to prompts. In some embodiments, the generative response engine can provide a greater variety of outputs that can be rendered by the front end. Collectively, the present technology can render dynamic user interface elements in response to prompts received by the generative response engine. Generative response engines that can provide dynamic and multimodal responses that are appropriate to a task are useful for an increased range of tasks.

21 Claims, 13 Drawing Sheets

(56) References Cited

U.S. PATENT DOCUMENTS

| | | | | |
|---|---|---|---|---|
| 2018/0331979 | A1* | 11/2018 | Rakovitsky | G06Q 30/0641 |
| 2019/0042988 | A1* | 2/2019 | Brown | G06F 16/9535 |
| 2019/0362009 | A1* | 11/2019 | Miseldine | G06F 16/9032 |
| 2021/0158811 | A1* | 5/2021 | Di Fabbrizio | G10L 13/00 |
| 2021/0248376 | A1* | 8/2021 | Zhao | G06V 20/49 |
| 2021/0383800 | A1* | 12/2021 | Pair | G10L 15/22 |
| 2022/0012076 | A1* | 1/2022 | Natarajan | G06N 3/084 |
| 2022/0043972 | A1* | 2/2022 | Nishida | G06F 40/20 |
| 2022/0044134 | A1* | 2/2022 | Joy | G06N 3/045 |
| 2022/0179665 | A1* | 6/2022 | Rathod | G06F 9/451 |
| 2022/0293107 | A1* | 9/2022 | Leaman | G06F 16/951 |
| 2022/0343250 | A1* | 10/2022 | Tremblay | G06Q 10/0633 |
| 2022/0343903 | A1* | 10/2022 | Mostafazadeh | G06F 40/35 |
| 2022/0414228 | A1* | 12/2022 | Difonzo | G06F 16/24522 |
| 2023/0014904 | A1* | 1/2023 | Skiles | G06F 40/103 |
| 2023/0021797 | A1* | 1/2023 | Gupta | G06F 16/3346 |
| 2023/0063568 | A1* | 3/2023 | Hassan | G06F 3/0622 |
| 2023/0065915 | A1* | 3/2023 | Berestovsky | G06F 40/30 |
| 2023/0135536 | A1* | 5/2023 | Li | G06F 16/3331 |
| | | | | 707/722 |
| 2024/0126624 | A1* | 4/2024 | Ghergu | G06F 9/547 |

* cited by examiner

ADAPTIVE UI FOR RICH OUTPUT RENDERING OF ASSISTANT MESSAGES

CROSS-REFERENCE TO RELATED APPLICATIONS

This application claims the benefit of priority to U.S. provisional application No. 63/555,462, filed on Feb. 20, 2024, entitled ADAPTIVE UI FOR RICH OUTPUT RENDERING OF ASSISTANT MASSAGES, which is expressly incorporated by reference herein in its entirety.

BACKGROUND

Generative response engines such as large language models represent a significant milestone in the field of artificial intelligence, revolutionizing computer-based natural language understanding and generation. Generative response engines, powered by advanced deep learning techniques, have demonstrated astonishing capabilities in tasks such as text generation, translation, summarization, and even code generation. Generative response engines can sift through vast amounts of text data, extract context, and provide coherent responses to a wide array of queries.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims.

FIG. 8A, FIG. 8B, and FIG. 8C illustrate an example interactive thread 800 in accordance with some aspects of the present technology.

DETAILED DESCRIPTION

Figure 1:
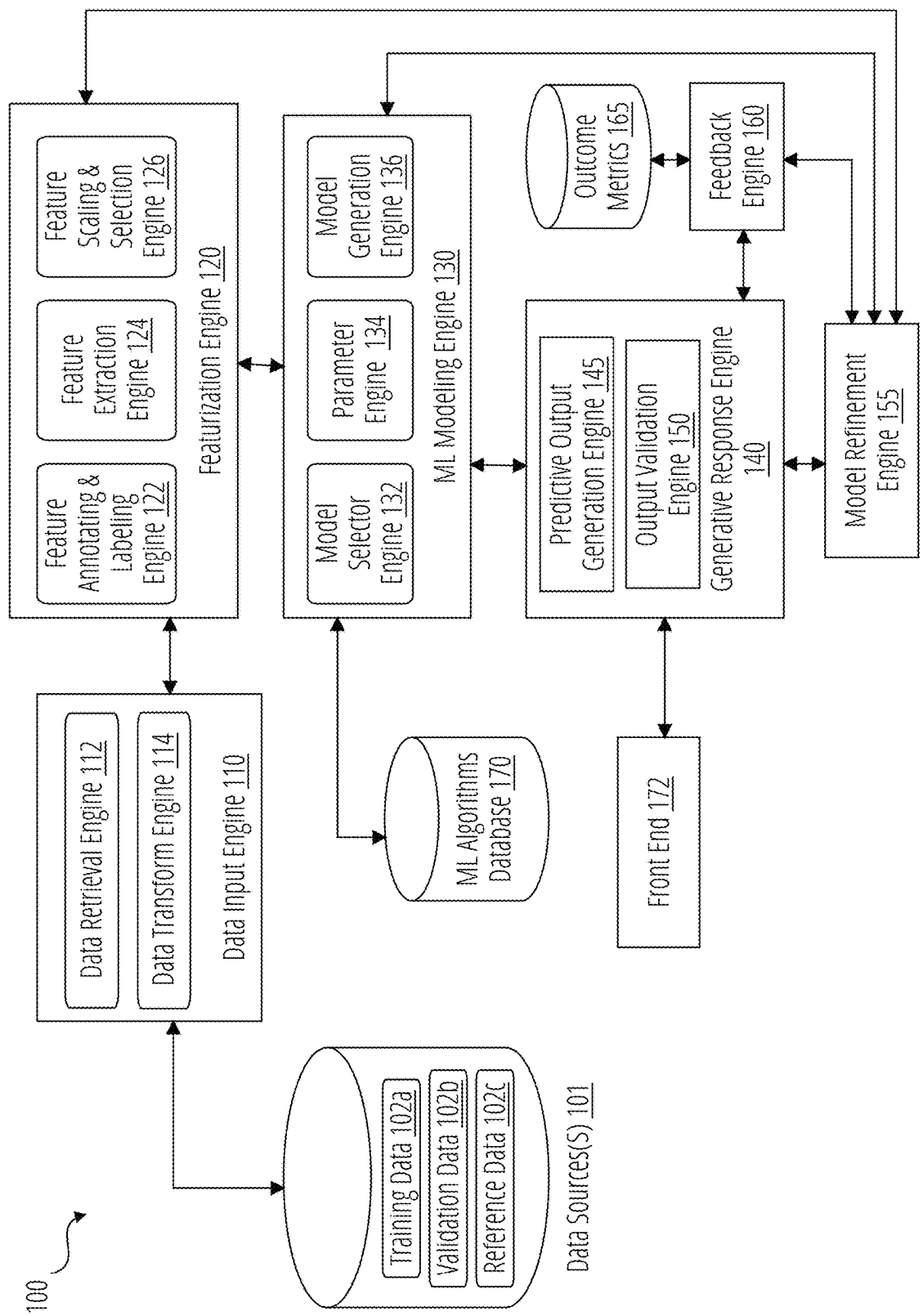
FIG. 1 is a block diagram illustrating an exemplary machine learning platform for implementing various aspects of this disclosure in accordance with some aspects of the present technology.

Generative response engines such as large language models represent a significant milestone in the field of artificial intelligence, revolutionizing computer-based natural language understanding and generation. Generative response engines, powered by advanced deep learning techniques, have demonstrated astonishing capabilities in tasks such as text generation, translation, summarization, and even code generation. However, despite their remarkable linguistic prowess, these generative response engines are limited to in how they present their responses.

Many generative response engines provide a conversational user interface powered by a chatbot whereby the user account interacts with the generative response engine through natural language conversation with the chatbot. Such a user interface provides an intuitive format to provide prompts or instructions to the generative response engine. In fact, the conversational user interface powered by the chatbot can be so effective that users can feel as if they are interacting with a person. Some user accounts find the generative response engine effective enough that they utilize the conversational user interface powered by the chatbot as they would an assistant. While the chatbot user interface is comfortable to use for some tasks, it also creates limitations. For example, a text only interface both limits the quality of inputs and outputs to the generative response engine. And this limitation on inputs and outputs limits what tasks the generative response engine can effectively perform because the input might not be precise enough to convey a concept, and the output of the generative response engine has limited flexibility in how it formats and presents its response, and the response interface is mostly static.

Even when interacting with a multi-modal generative response engine that can receive text or images as prompts and that can output responses in text or images, the user interface is limited. For example, CHAT-GPT-4, which is an example of a multimodal generative response engine, can provide an image and/or text in response to a textual prompt. Although text and images are effective means to convey information, the user interface lacks the flexibility to provide other visual formats in the response. Other visual formats might be more effective in conveying the information in the response, or other visual formats might be closer to the actual output the user account desires. For example, if a user account requests data about a period, the user account might really desire a graph, but the current user interfaces of generative response engines can only provide the data in text, or draw a picture of a graph that might not be appropriate for the purposes of the user account.

Another limitation of the user interfaces of generative response engines is that they are not particularly flexible or adaptive. Generative response engines seemingly have all of public human knowledge at their command, but some concepts or tasks would benefit from a more adaptive interface for receiving prompts or delivering answers. Some concepts are better conveyed in a combination of modalities, or better conveyed with dynamic or interactive content.

In addition to the fact that current limitations of user interfaces of generative response engines inhibit their capabilities to convey some information effectively, the modality in which current generative response engines are limited also limits what user accounts might choose to use the generative response engine for. The predominantly text output of generative response engines shapes user interaction with the generative response engine as much as any content it delivers.

The limitations in the output of generative response engines and the presentation of the output also result in a poor user experience. Text is not always the easiest way to communicate.

In the case of providing inputs to the generative response engine, inputs provided through graphical user interface elements can be used to provide more precise inputs with less effort. For example, if you had to communicate in natural language to change the volume on your computer (e.g., 'please turn down the volume, seven units'), it would be very tedious; a dial or slider user interface is more effective. In another example, it is hard to convey subtleties in color without a color palette. We are not well suited to ask for a image or graph that uses particular colors. It would be tedious to say "use color #00008B for specified pixels and user color ##AA336A for other pixels."

Current constraints force generative response engines to compress their rich, multidimensional knowledge into plain text, stripping away layers of context and nuance. This is not ideal when the information returned by the model calls for visual engagement and interactive exploration beyond what text can offer.

The present technology addresses these shortcomings by providing context dependent user interface elements that are effective to provide inputs to the generative response engine. The present technology also allows generative response engines to adapt responses to fit the prompt. In some embodiments, the generative response engine can provide a greater variety of outputs that can be rendered by the front end. Collectively, the present technology can render dynamic user interface elements in response to prompts received by the generative response engine. Generative response engines that can provide dynamic and multimodal responses that are appropriate to a task are useful for an increased range of tasks. These dynamic and multimodal responses are both more effective in conveying an answer by using visual formats where that is more appropriate, but they are more effective receiving follow up prompts because these dynamic and multimodal responses can receive user inputs in graphical portions of the response that can supplement a follow up textual prompt.

Additionally, the adaptive user interface of the present technology will open up new ways of interacting with the generative response engine that can improve the user experience of interacting with generative response engines and may help users to provide better input to the generative response engine, which in turn, would improve the responses provided by the generative response engine.

The present technology can provide these and other improvements over the state of the art.

FIG. 1 is a block diagram illustrating an example machine learning platform for implementing various aspects of this disclosure in accordance with some aspects of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

System 100 may include data input engine 110 that can further include data retrieval engine 112 and data transform engine 114. Data retrieval engine 112 may be configured to access, interpret, request, or receive data, which may be adjusted, reformatted, or changed (e.g., to be interpretable by another engine, such as data input engine 110). For example, data retrieval engine 112 may request data from a remote source using an API. Data input engine 110 may be configured to access, interpret, request, format, re-format, or receive input data from data sources(s) 101. For example, data input engine 110 may be configured to use data transform engine 114 to execute a re-configuration or other change to data, such as a data dimension reduction. In some embodiments, data sources(s) 101 may be associated with a single entity (e.g., organization) or with multiple entities. Data sources(s) 101 may include one or more of training data 102*a* (e.g., input data to feed a machine learning model as part of one or more training processes), validation data 102*b* (e.g., data against which at least one processor may compare model output with, such as to determine model output quality), and/or reference data 102*c*. In some embodiments, data input engine 110 can be implemented using at least one computing device. For example, data from data sources(s) 101 can be obtained through one or more I/O devices and/or network interfaces. Further, the data may be stored (e.g., during execution of one or more operations) in a suitable storage or system memory. Data input engine 110 may also be configured to interact with a data storage, which may be implemented on a computing device that stores data in storage or system memory.

System 100 may include featurization engine 120. Featurization engine 120 may include feature annotating & labeling engine 122 (e.g., configured to annotate or label features from a model or data, which may be extracted by feature extraction engine 124), feature extraction engine 124 (e.g., configured to extract one or more features from a model or data), and/or feature scaling & selection engine 126 Feature scaling & selection engine 126 may be configured to determine, select, limit, constrain, concatenate, or define features (e.g., AI features) for use with AI models.

System 100 may also include machine learning (ML) ML modeling engine 130, which may be configured to execute one or more operations on a machine learning model (e.g., model training, model re-configuration, model validation, model testing), such as those described in the processes described herein. For example, ML modeling engine 130 may execute an operation to train a machine learning model, such as adding, removing, or modifying a model parameter. Training of a machine learning model may be supervised, semi-supervised, or unsupervised. In some embodiments, training of a machine learning model may include multiple epochs, or passes of data (e.g., training data 102*a*) through a machine learning model process (e.g., a training process). In some embodiments, different epochs may have different degrees of supervision (e.g., supervised, semi-supervised, or unsupervised). Data into a model to train the model may include input data (e.g., as described above) and/or data previously output from a model (e.g., forming a recursive learning feedback). A model parameter may include one or more of a seed value, a model node, a model layer, an algorithm, a function, a model connection (e.g., between other model parameters or between models), a model constraint, or any other digital component influencing the output of a model. A model connection may include or represent a relationship between model parameters and/or models, which may be dependent or interdependent, hierarchical, and/or static or dynamic. The combination and configuration of the model parameters and relationships between model parameters discussed herein are cognitively infeasible for the human mind to maintain or use. Without limiting the disclosed embodiments in any way, a machine learning model may include millions, billions, or even trillions of model parameters. ML modeling engine 130 may include model selector engine 132 (e.g., configured to select a model from among a plurality of models, such as based on input data), parameter engine 134 (e.g., configured to add, remove, and/or change one or more parameters of a model), and/or model generation engine 136 (e.g., configured to generate one or more machine learning models, such as according to model input data, model output data, comparison data, and/or validation data).

In some embodiments, model selector engine 132 may be configured to receive input and/or transmit output to ML algorithms database 170. Similarly, featurization engine 120 can utilize storage or system memory for storing data and can utilize one or more I/O devices or network interfaces for transmitting or receiving data. ML algorithms database 170 may store one or more machine learning models, any of which may be fully trained, partially trained, or untrained. A machine learning model may be or include, without limitation, one or more of (e.g., such as in the case of a meta-model) a statistical model, an algorithm, a neural network (NN), a convolutional neural network (CNN), a generative neural network (GNN), a Word2Vec model, a bag of words model, a term frequency-inverse document frequency (tf-idf) model, a GPT (Generative Pre-trained Transformer) model (or other autoregressive model), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, or any other type of model described further herein. Two specific examples of machine learning models that can be stored in the ML algorithms database 170 include versions DALL. E and CHAT GPT, both provided by OPEN AI.

System 100 can further include generative response engine 140 that is made up of a predictive output generation engine 145, output validation engine 150 (e.g., configured to apply validation data to machine learning model output). Predictive output generation engine 145 can be configured to receive inputs from front end 172 that provide some guidance as to a desired output. Predictive output generation engine 145 can analyze the input and identify relevant patterns and associations in the data it has learned to generate a sequence of words that predictive output generation engine 145 predicts is the most likely continuation of the input using one or more models from the ML algorithms database 170, aiming to provide a coherent and contextually relevant answer. Predictive output generation engine 145 generates responses by sampling from the probability distribution of possible words and sequences, guided by the patterns observed during its training. In some embodiments, predictive output generation engine 145 can generate multiple possible responses before presenting the final one. Predictive output generation engine 145 can generate multiple responses based on the input, and these responses are variations that predictive output generation engine 145 considers potentially relevant and coherent. Output validation engine 150 can evaluate these generated responses based on certain criteria. These criteria can include relevance to the prompt, coherence, fluency, and sometimes adherence to specific guidelines or rules, depending on the application. Based on this evaluation, output validation engine 150 selects the most appropriate response. This selection is typically the one that scores highest on the set criteria, balancing factors like relevance, informativeness, and coherence.

System 100 can further include feedback engine 160 (e.g., configured to apply feedback from a user and/or machine to a model) and model refinement engine 155 (e.g., configured to update or re-configure a model). In some embodiments, feedback engine 160 may receive input and/or transmit output (e.g., output from a trained, partially trained, or untrained model) to outcome metrics database 165. Outcome metrics database 165 may be configured to store output from one or more models and may also be configured to associate output with one or more models. In some embodiments, outcome metrics database 165, or other device (e.g., model refinement engine 155 or feedback engine 160), may be configured to correlate output, detect trends in output data, and/or infer a change to input or model parameters to cause a particular model output or type of model output. In some embodiments, model refinement engine 155 may receive output from predictive output generation engine 145 or output validation engine 150. In some embodiments, model refinement engine 155 may transmit the received output to featurization engine 120 or ML modeling engine 130 in one or more iterative cycles.

The engines of system 100 may be packaged functional hardware units designed for use with other components or a part of a program that performs a particular function (e.g., of related functions). Any or each of these modules may be implemented using a computing device. In some embodiments, the functionality of system 100 may be split across multiple computing devices to allow for distributed processing of the data, which may improve output speed and reduce computational load on individual devices. In some embodiments, system 100 may use load-balancing to maintain stable resource load (e.g., processing load, memory load, or bandwidth load) across multiple computing devices and to reduce the risk of a computing device or connection becoming overloaded. In these or other embodiments, the different components may communicate over one or more I/O devices and/or network interfaces.

System 100 can be related to different domains or fields of use. Descriptions of embodiments related to specific domains, such as natural language processing or language modeling, is not intended to limit the disclosed embodiments to those specific domains, and embodiments consistent with the present disclosure can apply to any domain that utilizes predictive modeling based on available data.

Figure 2:
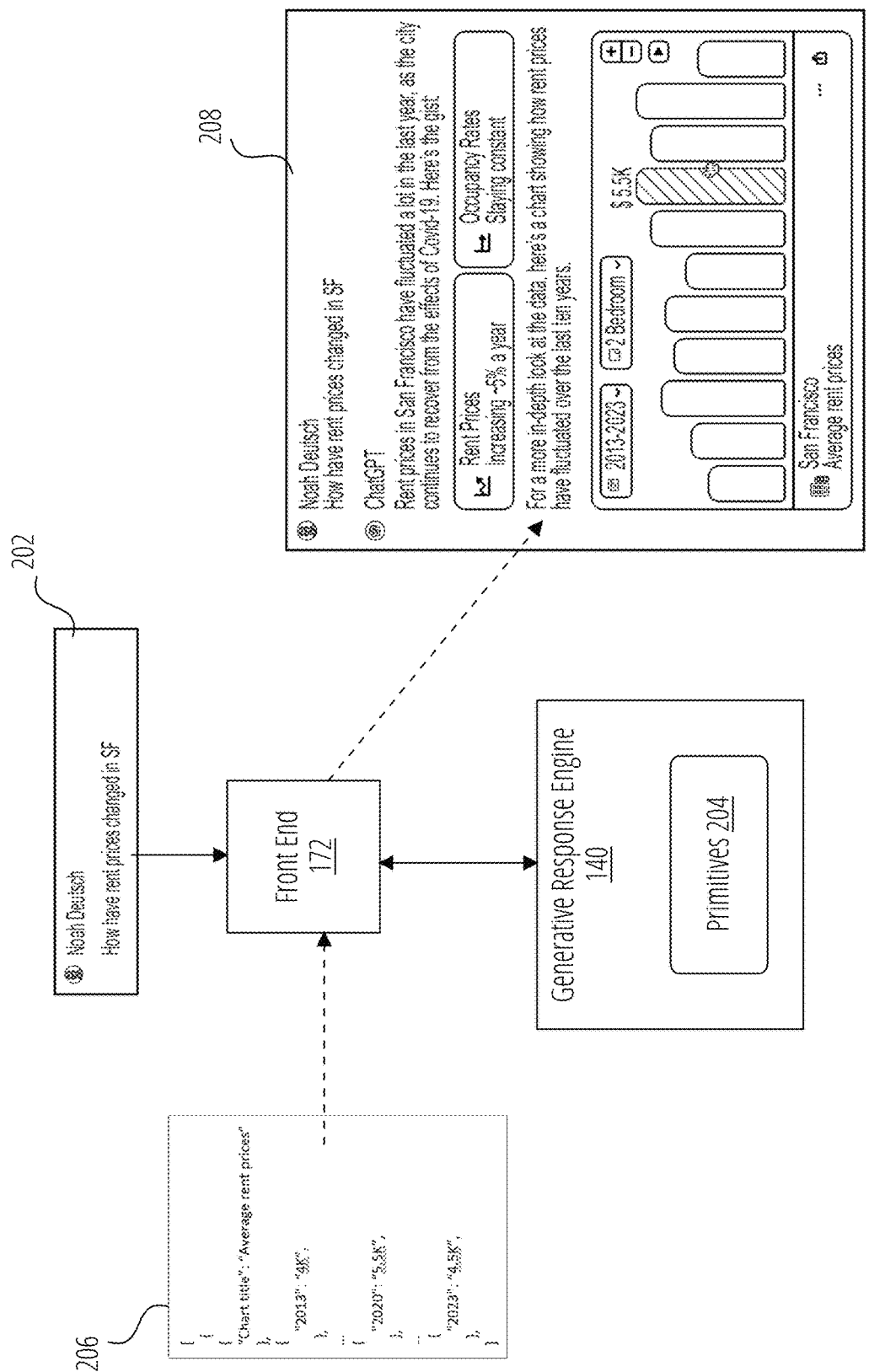
FIG. 2 illustrates a more focused view of system and includes an example prompt and example response in accordance with some aspects of the present technology.

FIG. 2 illustrates a more focused view of system 100 and includes an example prompt and example response in accordance with some aspects of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

FIG. 2 illustrates an example prompt 202 that is input into front end 172. Front end 172 provides the user interface for the generative response engine, and is configured to receive prompts, such as example prompt 202, from a user account, to provide the prompts to generative response engine 140, and to display responses from the generative response engine 140.

As is addressed in greater detail herein, generative response engine 140 is adapted (through training) to determine that a response to the prompt would benefit from using one or more primitives in the generation of the response. Generative response engine 140 has been trained to determine when the response should utilize a first primitive from a collection of primitives 204 to generate the response. Primitives 204 cause at least a portion of the output of the generative response engine to include structured data as defined by the first primitive. The structured data in the response can be recognized by the front end 172 and used to render the structured data in a visual format.

In some embodiments, generative response engine 140 is trained to select a primitive from a collection of primitives when desirable for creating a response to the prompt. The training of the generative response engine can utilize a reinforcement learning process, whereby the generative response engine can identify a primitive to be used when responding to a training prompt and provide a score to reflect the confidence that the primitive should be used to prepare the response to the prompt. Feedback can be provided to the generative response engine through a reward function. The feedback can be in the form of an external score from a source other than the generative response engine that indicates whether the primitive should be utilized. For example, the external score can be provided by human labelers. As is common in reinforcement learning, the generative response engine can adjust itself to produce future scoring that is more likely to receive higher external scores.

FIG. 2 shows an example chart primitive 206. The example chart primitive 206 is passed to front end 172 to render an adaptive user interface as illustrated by the example adaptive user interface 208. The dotted lines show a path of the primitive being rendered by front end 172, but this is not the actual data path. The data path is shown by the solid line.

In order to render the adaptive user interface, front end 172 can include a variety of services that are configured to render a variety of dynamic user interface elements when provided with data in an understandable structure. For example, front end 172 can have access to a variety of libraries and frameworks that are able to render dynamic user interface elements from the structured data. Front end 172 can include libraries to create diagrams, charts, maps, slides, code, tables, folders, calendars and calendar reminders, drag and drop lists, editable text, information tile, HTML apps, HTML webpage elements, images, etc. Some example libraries and frameworks include MERMAID for diagrams, CHART.JS, VEGA for charts, MAPBOX for maps, REVEAL.JS for slides, SOURCETRAIL for code, AG GRID for tables, JSTREE for code, FULLCALENDAR AND DATAPICKER for calendars, DRAGULA for drag and drop lists, QUILL.JS for text editing, and SEMANTIC-UI CARD for information tile.

Front end 172 can also provide dynamic user interface elements for receiving prompts. For example, textual prompts are effective in conveying a wide range of ideas, but when a specific concept, especially one that is nuanced or detailed, specialized interfaces can be easier to use and more effective in conveying the correct information without ambiguity. As an example, if a prompt were to request a chart with some cells highlighted in light blue, the concept of light blue is both specific and vague. There might be tens, if not hundreds of shades of light blue. To convey such a concept, a color picker would be most effective since the user could select the exact color, which would map to a hexadecimal color code. Such an input would be both specific and unambiguous.

Front end 172 can provide access to a variety of input objects in a visual format including a color picker, date/time pickers, numeric steppers, range selectors, validated forms, rating inputs, switches, slides, multi-select dropdowns, radio button groups, checkbox groups, cascading dropdowns (dropdowns that change their content based on the selection made in another dropdown) maps, folder structures, drag and drop lists, etc. Front end 172 can utilize any of the frameworks referenced above and others to receive user inputs.

Users can access the input object by navigating a menu to locate a desired input object or through natural language interaction with the generative response engine 140. In the case of natural language interaction, the user account could request the desired input object to be presented, or the generative response engine 140 might provide a follow up question along with an appropriate input object to encourage the user account to provide more specific input. For example, the user account could provide a prompt to "create a table with the headings having a light blue background" and the generative response engine 140 could respond with a response that says "There are a great variety of shades of light blue-do you want to pick a shade from this color palette?"

Figure 8A:
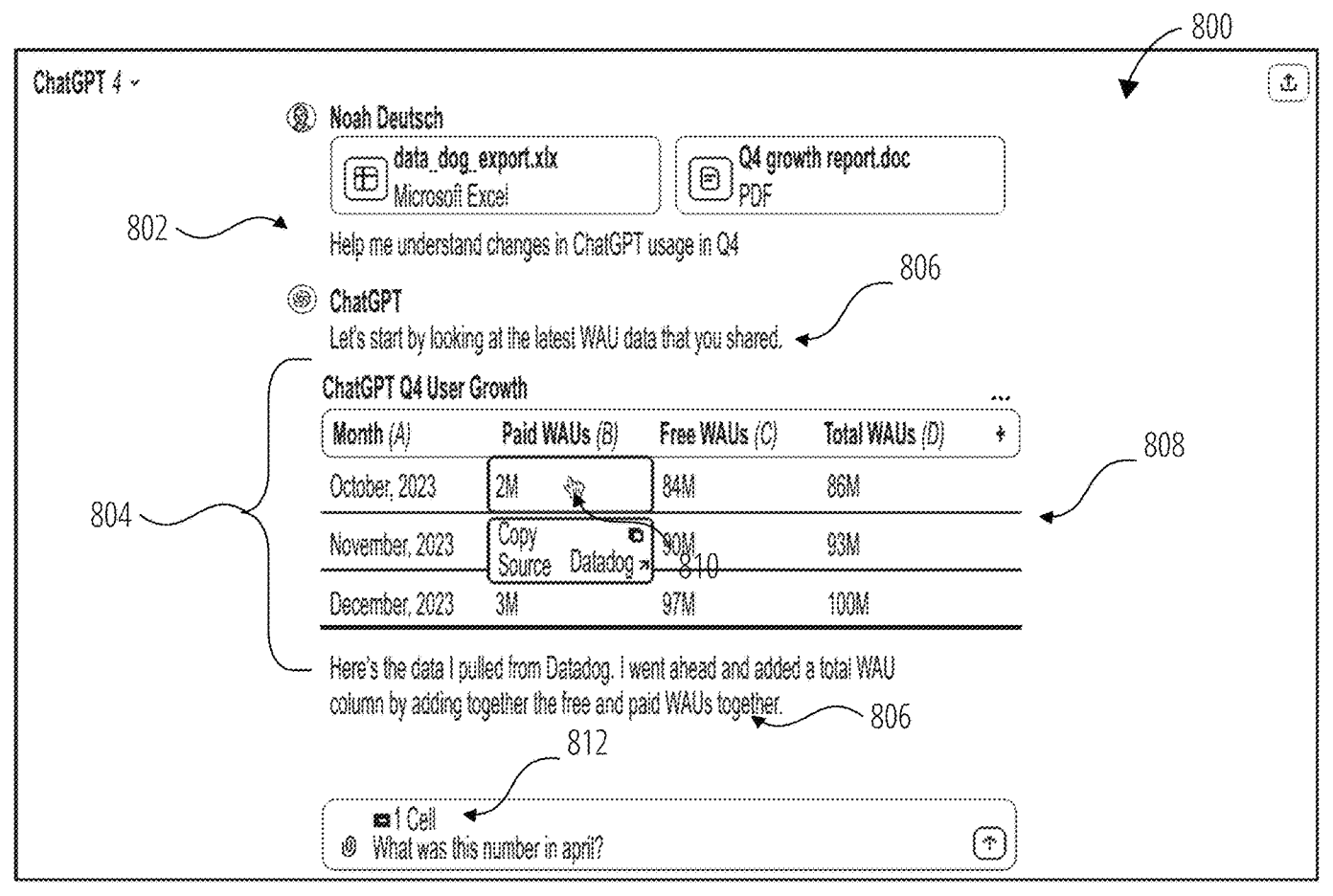

In some embodiments, when a portion of a prompt (whether an initial prompt, or a second or subsequent prompt in a thread) is provided through a visual format, the portion of the prompt is not converted to text to be inserted into a text prompt. Rather, the front end 172 can understand that the input provided through interaction with the visual format is intended to as part of a prompt and can directly convey that information to the generative response engine. FIG. 8A addresses this embodiment in greater detail.

In some embodiments, when a portion of a prompt (whether an initial prompt, or a second or subsequent prompt in a thread) is provided through a visual format, the portion of the prompt is used to revise or generate a text prompt that is shown in the graphical user interface for receiving a text prompt.

Contrasting these embodiments, it can be effective to translate a visual input into text in some embodiments. For example, it can be effective to ask to draw a graph with a line drawn in the color deep blue, where the color deep blue was selected from a color picker and results in the prompt, "draw a graph with a line drawn using #00008B." But it would not be effective to translate the prompt in FIG. 8A "What was this number in April?" into the prompt "What was 2M in April?" because the question in FIG. 8A is not about the number 2M but rather it is about the category of data displayed in the table. The front end 172 can be configured to amend (or not amend) a textual prompt displayed to the user based on the visual format used to receive the input.

In total, the present technology provides a mechanism by which a generative response engine that is limited to predominately text inputs and outputs can provide a dynamic user interface that can make the generative response engine 140 more useful for a variety of tasks and better at conveying and receiving some types of information.

Additionally, the present technology can also be used to provide accessibility functions to users with sensory or cognitive challenges or fine motor movement challenges and other impairments. For example, users with dyslexia or visual impairments might appreciate charts or other graphics over text, or users who have difficulty typing might prefer more graphical user interfaces to convey information in prompts.

Figure 3:
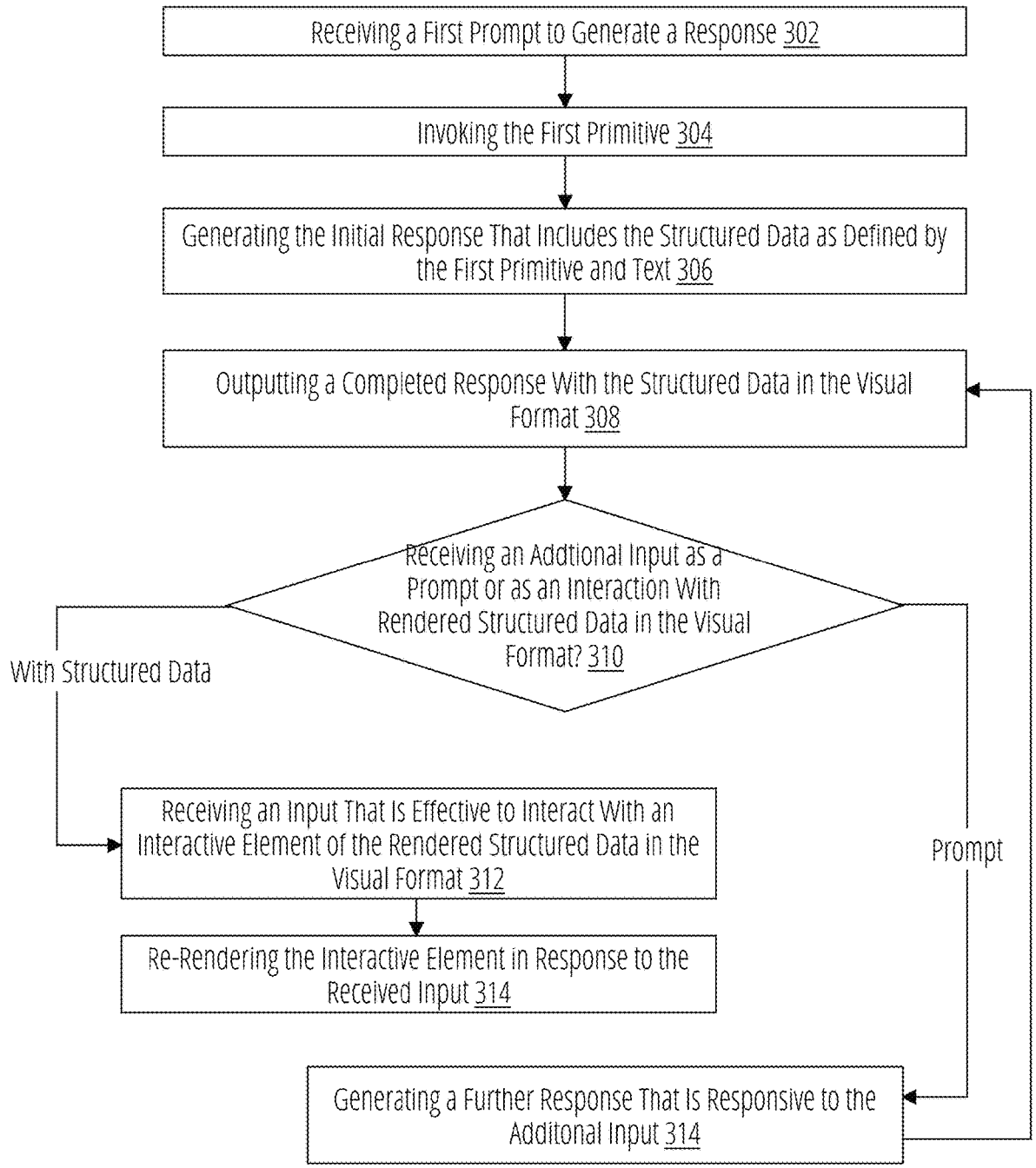
FIG. 3 illustrates an example routine for enabling a generative response engine to be adaptive in providing responses and to present responses using a dynamic and versatile user interface in accordance with some aspects of the present technology.

FIG. 3 illustrates an example routine for enabling a generative response engine to be adaptive in providing responses and to present responses using a dynamic and versatile user interface in accordance with some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

Figure 4A:
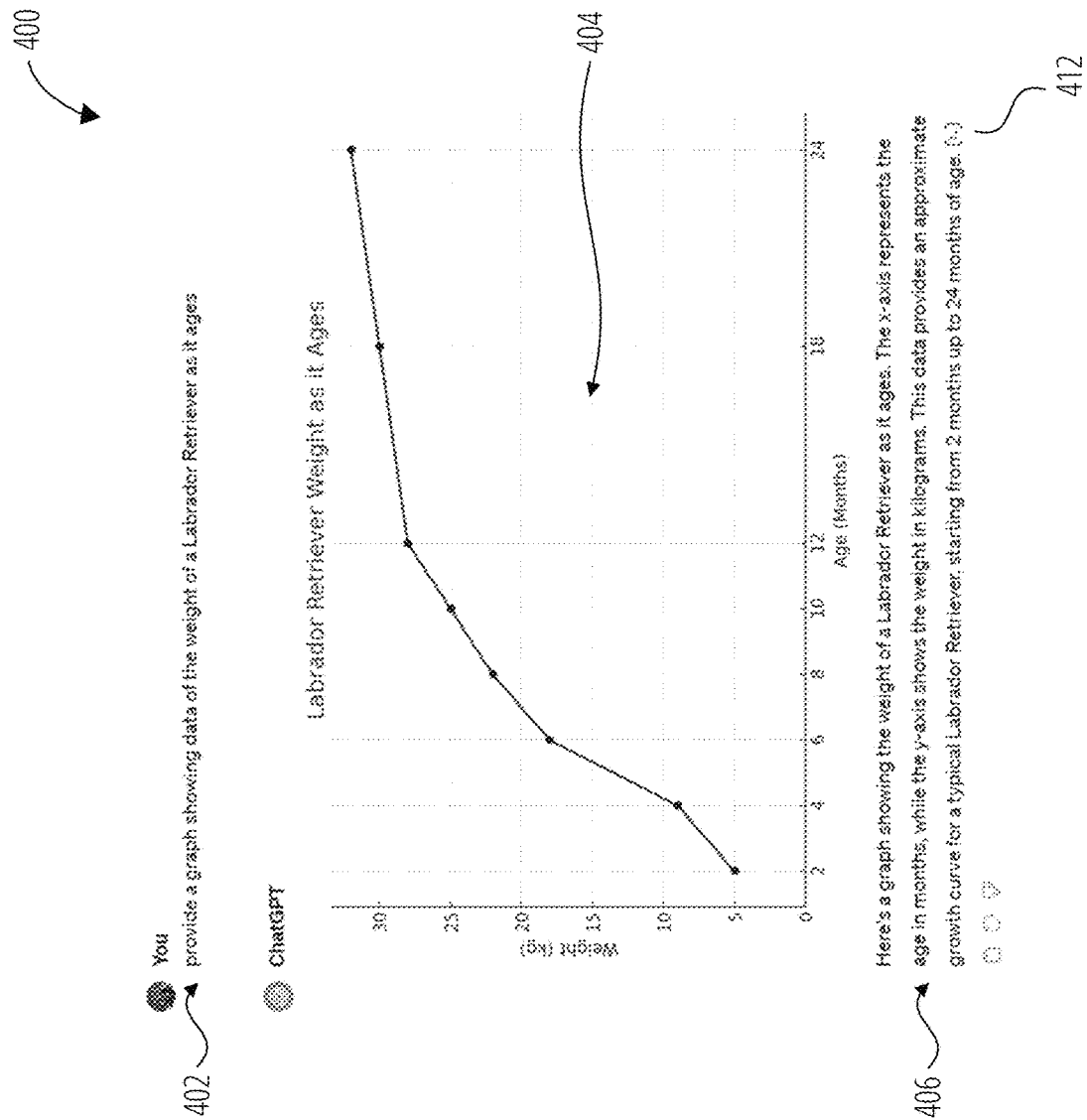
FIG. 4A illustrates an example thread showing a graph as the structured data in the visual format in accordance with some aspects of the present technology.

According to some examples, the method includes receiving a first prompt to generate a response at block 302. For example, the generative response engine 140 illustrated in FIG. 1 may receive a first prompt to generate a response. Some example prompts provided to front end 172 are illustrated in FIG. 4A. FIG. 5, FIG. 6, FIG. 7, and FIG. 8A. These prompts are received by front end 172 and passed to generative response engine 140.

Figure 5:
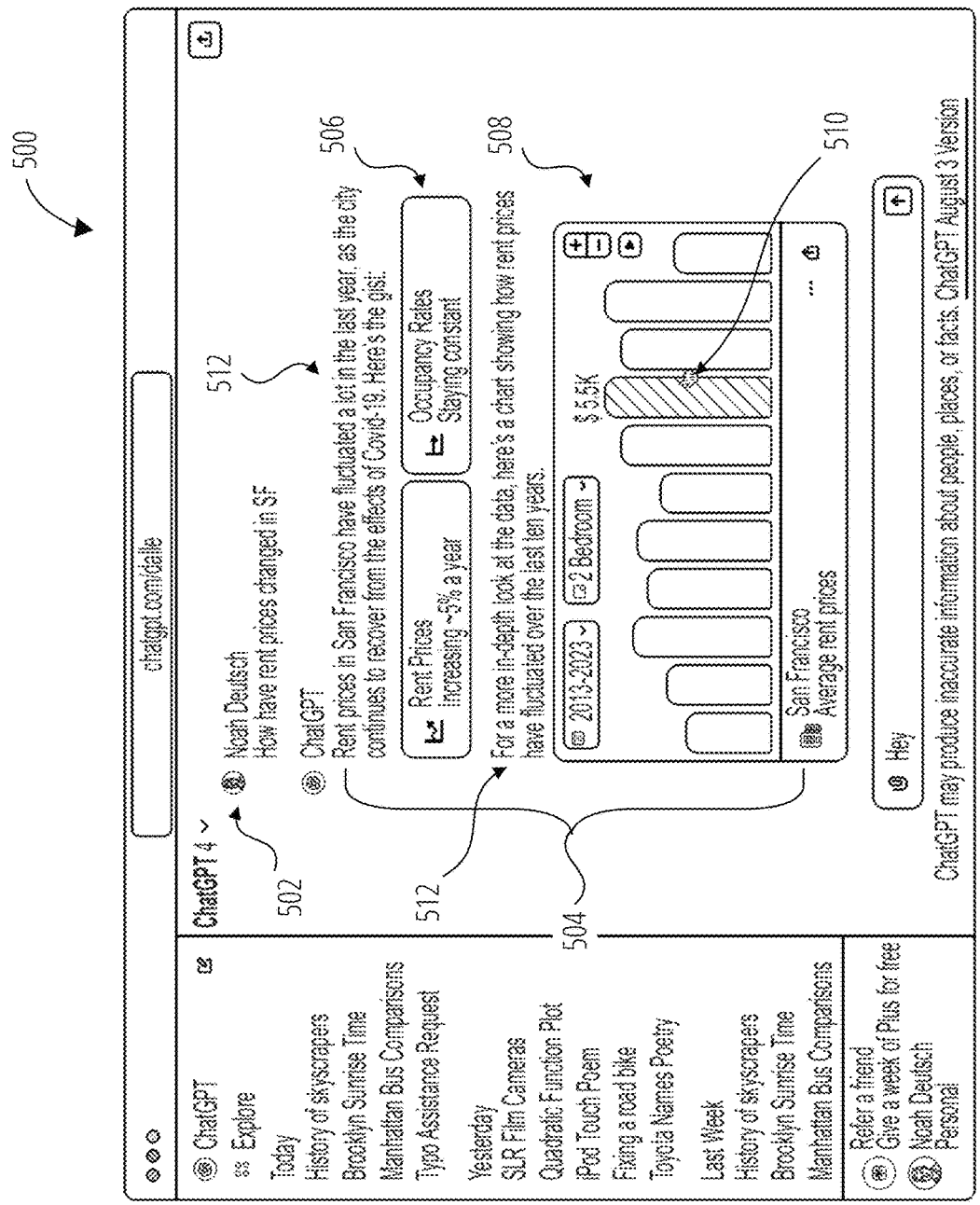
FIG. 5 illustrates an example thread showing a chart as the visual format in accordance with some aspects of the present technology.

Prompts can include simple textual queries such as 'Provide a graph showing data of the weight of a Labrador Retriever as it ages' as illustrated in FIG. 4A or queries to interpret or summarize an uploaded file(s) as illustrated in FIG. 8A, or a textual query such as 'How have rent prices changed in SF?' as illustrated in FIG. 5. Beyond textual user inputs, prompts can utilize graphical user interface input objects as well. Front end 172 can provide access to a variety of visual format input objects including a color picker, date/time pickers, numeric steppers, range selectors, validated forms, rating inputs, switches, slides, multi-select dropdowns, radio button groups, checkbox groups, cascading dropdowns (dropdowns that change their content based on the selection made in another dropdown) maps, folder structures, drag and drop lists, etc.

Users can access the input object by navigating a menu to locate a desired input object or through natural language interaction with the generative response engine 140. In the case of natural language interaction, the user account could request the desired input object to be presented, or the response from the generative response engine 140 might provide a follow up question along with an appropriate input object to encourage the user account to provide more specific input. For example, the user account could provide a prompt to "create a table with the headings having a light blue background" and the generative response engine 140 could respond with a response that says "There are a great variety of shades of light blue-do you want to pick a shade from this color palette?"

Figure 6:
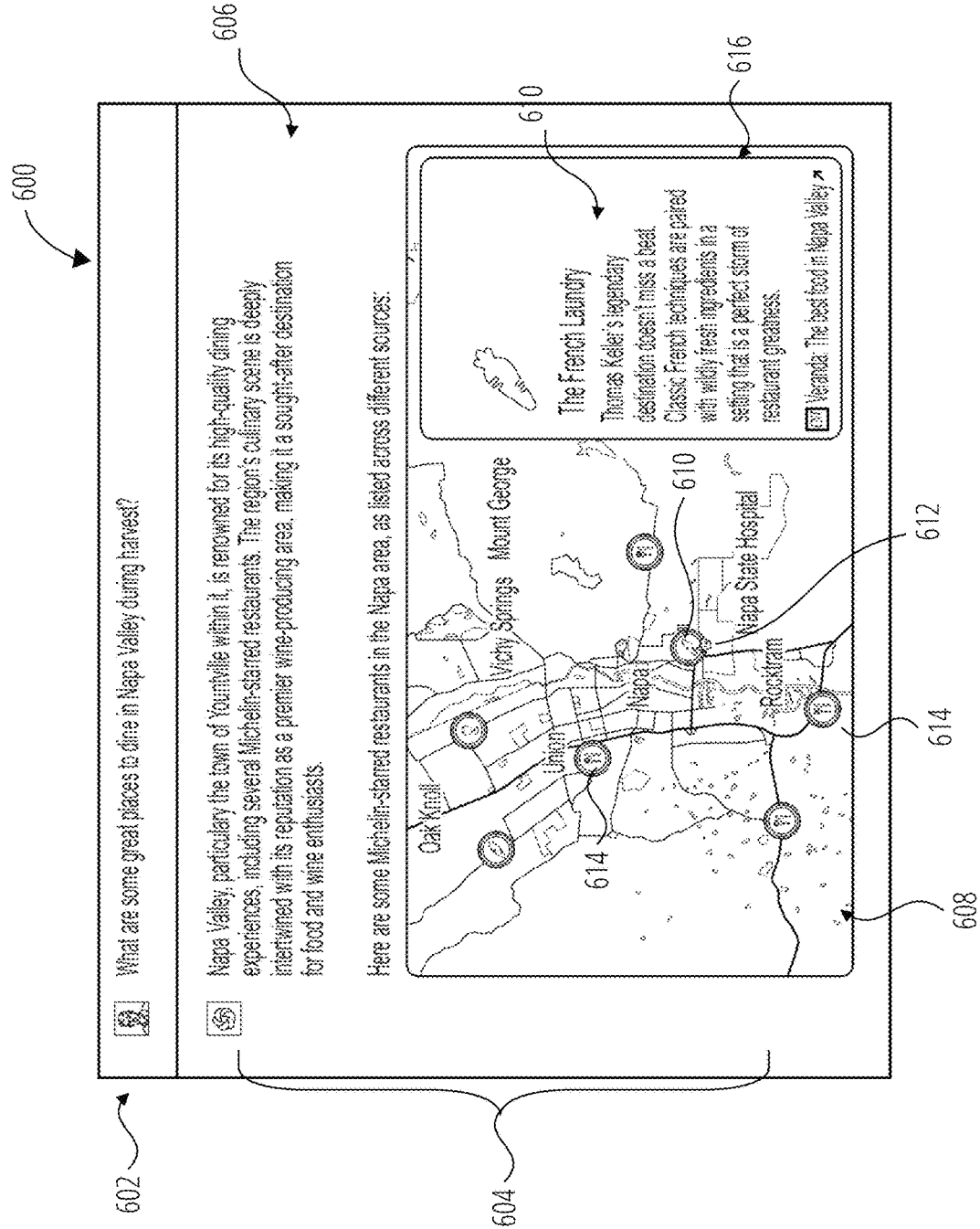
FIG. 6 illustrates an example thread showing a map with an information tile as the visual format in accordance with some aspects of the present technology.

In some embodiments, the graphical user interface input objects can be used as part of the initial prompt, or the graphical user interface input objects can be presented throughout a thread pertaining to a topic. For example, FIG. 6 illustrates a map showing selectable locations, and FIG. 8A illustrates a table where one or more cells can be selected and referenced in further prompts in the thread.

Accordingly, both prompts and responses can utilize visual formats to convey information and to interact with information, as is addressed in more detail herein.

As introduced above, the generative response engine can be trained to recognize when some responses would benefit from a response in a format other than the predominant modality of the generative response engine. For example, if the predominant modality of the generative response engine is text, the generative response engine can be trained to output text in a structured way. Such structure can be defined by a primitive.

According to some examples, the method includes invoking the first primitive at block 304. For example, the generative response engine 140 illustrated in FIG. 1 may invoke the first primitive when a possible output of the generative response engine 140 provides a high probability that a first primitive should used to prepare the response to the prompt.

The generative response engine 140 can have access to a collection of primitives and can be trained to select and use the appropriate primitive. In some embodiments, primitives can be associated with respective visual formats. For example, a primitive can define structured data to be used to create diagrams, charts, maps, slides, code, tables, folders, calendars and calendar reminders, drag and drop lists, editable text, information tile, HTML apps, HTML webpage elements, images, etc.

The first primitive selected at block 304 can aid the generative response engine to output an initial response that includes structured data as defined by the first primitive. In some respects, the first primitive can be a template in which to provide data generated by the generative response engine. In the example of a visual format that is more defined, such as a graph, presentation tile, or map, the first primitive defines a data format useable to create the graph, presentation tile, or map where the generative response engine can fill in the data to be displayed in the visual format.

Figure 7:
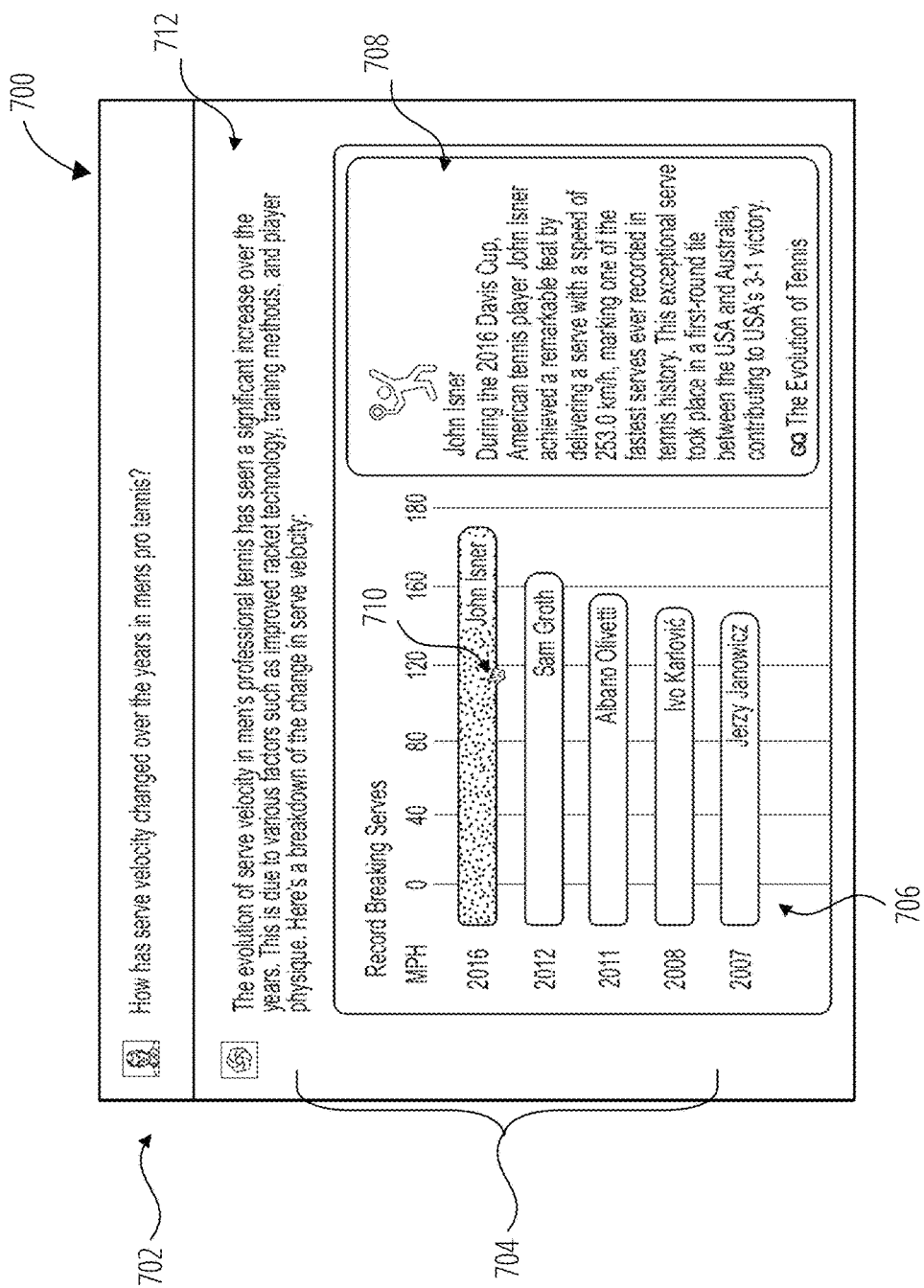
FIG. 7 illustrates an example thread showing a chart with an information tile as the visual format in accordance with some aspects of the present technology.

FIG. 4A, FIG. 5, FIG. 8A, and FIG. 8B illustrate example graphs and tables which are provided in responses including data in the visual format. FIG. 6 illustrates an example map interface as the visual format. FIG. 5, FIG. 6, and FIG. 7 illustrate example presentation tiles as the visual format. FIG. 9 illustrates an example HTML application as the structured data in the visual format. In some embodiments, a combination of visual formats can be used in the same response.

In the example of a visual format that is less defined, such as an HTML app, an HTML webpage element or image, the primitive includes a template system prompt to generate the HTML app, HTML webpage element or image that can be combined with a visual format prompt which is text provided by the generative response engine that defines the specifics of the HTML app, an HTML webpage element or image. The system prompt plus the visual format prompt may be used by the generative response engine to output the HTML app, an HTML webpage element or image.

While generative response engines may already be able to output code, including in HTML, there is a difference between providing the code in text and creating a renderable HTML object such as an application or webpage element. Accordingly, the present technology can combine a system prompt, which provides instructions to the generative response engine to produce renderable code. The system prompt can be combined with information generated from the user account provided prompt received at block 302. Alternatively, the generative response engine could learn to directly provide renderable HTML (or other code language) in response to a prompt without needing to utilize a primitive that includes the system prompt. Regardless of whether a primitive is utilized or not, the generative response engine can output renderable code to the front end. The front end 172 can be configured to render the code instead of to display the code in text. More detail about a primitive to generate an HTML app is addressed with respect to FIG. 9.

According to some examples, the method includes generating the initial response that includes the structured data as defined by the first primitive and text at block 306. For example, the generative response engine 140 illustrated in FIG. 1 may generate the initial response that includes at least the structured data as defined by the first primitive. The initial response is a textual output from the generative response engine before it has been passed to the front end 172 to be presented to the user.

According to some examples, the method includes outputting a completed response at block 308. For example, the front end 172 illustrated in FIG. 1 may output a completed response. The completed response includes the structured data in the visual format as rendered by the front end along with any additional text that is part of the completed response.

For example, when the first primitive defines a data format useable to create a table, the generative response engine can generate the structured data in the data format useable to create the table, and the front end can generate the table from the structured data. In some embodiments, the front end can utilize a table making framework, such as AG GRID or DATATABLE.NET, to render the table from the structured data.

In another example, when the first primitive defines a data format useable to create at least one information tile, the data format useable to create the information tile segregates portions of the structured data into segments corresponding to individual information tiles. The generative response engine can generate the structured data in the format useable to create at least one information tile, which is used by the front end to generate at least one information tile. In some embodiments, the front end can utilize an information tile framework, such as SEMANTIC-UI CARD, to render the information tile from the structured data.

In another example, the first primitive includes a template system prompt to generate an HTML object, an image, or an application to be included with the initial output, wherein the generative response engine generates code for the HTML object or application. While generative response engines may already be able to output code, including in HTML, there is a difference between providing the code in text and creating a renderable HTML object such as an application or webpage element. Accordingly, the present technology can combine a system prompt, which provides instructions to the generative response engine to produce renderable code. The system prompt can be combined with information generated from the user account provided prompt received at block 302. Alternatively, the generative response engine could learn to directly provide renderable HTML (or other code language) in response to a prompt without needing to utilize a primitive that includes the system prompt. Regardless of whether a primitive is utilized or not, the generative response engine can output renderable code to the front end. The front end 172 can be configured to render the code instead of to display the code in text.

In additional to providing data in a more useful format, another advantage of the present technology is that the rendered structured data in the visual format can be interactive. The user can interact with the rendered structured data in the visual format through a mechanism of providing a second prompt that references rendered structured data in the visual format, or through a mechanism of interacting directly with the rendered structured data in the visual format or a combination of these mechanisms.

In some embodiments, the user can provide inputs to adjust data displayed in the completed response, to adjust the visual format (table, graph, presentation tiles, etc.), to interpret the data and provide further responses based on the data presented in the visual format, etc.

According to some examples, the method includes receiving an additional input as a prompt or as an interaction with rendered structured data in the visual format at decision block 310. For example, the front end 172 illustrated in FIG. 1 may receive an additional input as a prompt or as an interaction with rendered structured data in the visual format. A distinction in whether the input is considered a prompt or interaction with the rendered structured data in the visual format is whether the front end can respond to the input on its own, or if the generative response engine 140 is needed to generate additional responsive data and/or revise the rendered structured data in the visual format.

When the interaction with the rendered structured data in the visual format is an input provided directly to the rendered structured data in the visual format, the method includes receiving the input at block 312. For example, the front end 172 illustrated in FIG. 1 may receive an input that is effective in interacting with an interactive element of the rendered structured data in the visual format. In some embodiments, the input that is effective to interact with the interactive element can be an edit input being effective to directly edit the visual format or the structured data. In some embodiments, the input that is effective to interact with the interactive element can be a selection input that is effective to select data in the rendered structured data in the visual format.

For example, FIG. 5 illustrates an example user input 510 provided to chart 508. In this example, the user has manipulated a cursor or selector over a portion of chart 412, and chart 412 has responded by highlighting the portion of chart 508.

For example, FIG. 6 illustrates an example user input 612 that is effective to interact with the interactive element provided to map 608. In this example, the user has manipulated a cursor or selector over a selected option 610, and map 608 has responded by displaying selected option 610 in an information tile 616.

FIG. 7 illustrates an example of user input 710 provided in chart 706. In this example, the user has manipulated a cursor or selector over a portion of chart 706, and chart 706 has responded by highlighting the portion of chart 706.

FIG. 8A illustrates an example of a user input 810 provided in table 808. In this example, the user has selected a cell in table 808 using a user interface device, and table 808 has responded by highlighting the cell. As will be addressed in more detail below, this selection is more than a highlight in table 808; the generative response engine 140 understands the semantic meaning of the selection of the cell.

In many examples, the visual format includes reactive user interface elements, that can respond to the user input that is effective to interact with the interactive element. While some user inputs merely require highlighting data, other user inputs might cause new columns to be added to a table, or new data to be displayed in the visual format. According to some examples, the method includes re-rendering the interactive element in response to the received input at block 314. For example, the front end 172 illustrated in FIG. 1 may re-render the interactive element in response to the input that is effective to interact with the interactive element. As addressed above, FIG. 5, FIG. 7, and FIG. 8A illustrate examples where the visual format responds by highlighting data.

Regardless of whether the additional input received at decision block 310 was provided by interacting with the interactive element, through a textual prompt, or a combination of the two, the additional input can be considered a prompt when the input is more than can be handled by the front end without requesting a response from the generative response engine 140.

According to some examples, the method includes receiving a second prompt at decision block 310. For example, the generative response engine 140 illustrated in FIG. 1 may receive a second prompt. The second prompt can include a reference to the structured data. For example, the second prompt requests a change to the display of the visual format of the structured data that requires output from the generative response engine, or the second prompt requests an interpretation of the structure data or a conclusion drawn from the structured data.

As illustrated in FIG. 3, when a prompt is received at decision block 310, the method can proceed to block 314 to generate a further response by the generative response engine 140 illustrated in FIG. 1 that is responsive to the additional input. The further response can again provide structured data, or it might be a text response that is responsive to a prompt referring to the rendered structured data in the visual format.

According to some examples, the method returns to block 308 to output a completed response by the front end 172. In this instance, the completed response is a second response based on the structured data, that is responsive to the second prompt. The second response may or may not include revised or additional structured data in the visual format.

FIG. 4A illustrates an example thread 400 showing a graph as the structured data in the visual format in accordance with some aspects of the present technology. Thread 400 begins with prompt 402 requesting a graph showing 'data of the weight of a Labrador retriever as it ages.' In response, generative response engine 140 has provided the requested graph 404 along with a text portion 406 of the response.

As addressed herein, the generative response engine 140 can provide graph 404 by outputting an initial response that includes text formatted as structured data, which can be interpreted and rendered by front end 172 to present graph 404.

FIG. 4A also shows a view structured data user interface element 412. A user can provide an input to select the view structured data user interface element 412 to result in the interface illustrated in FIG. 4B.

Figure 4B:
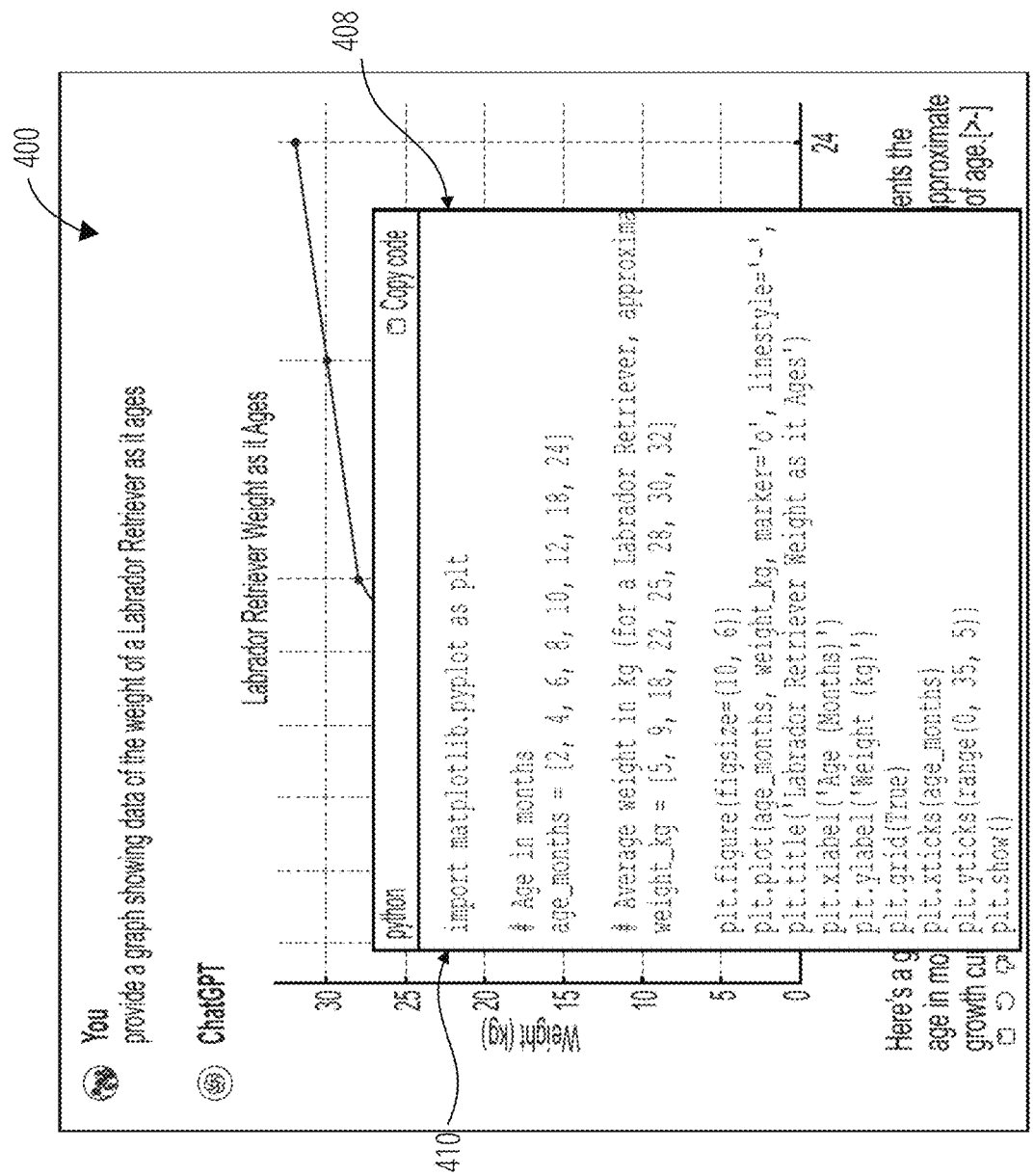
FIG. 4B illustrates the structured data used to generate the graph illustrated in FIG. 4A in accordance with some aspects of the present technology.

FIG. 4B illustrates the structured data used to generate the graph illustrated in FIG. 4A in accordance with some aspects of the present technology. In the example illustrated in FIG. 4B, the structured data 408 is provided in the coding language Python. Structured data 408 is a result of the generative response engine 140 populating a template provided by one of the primitives 204. In this example, the primitive specified the coding language Python and provided placeholders for the titles of axes of graph 404, and the format in which to present the data that was used to create the graph. The primitive also referenced a framework 410 to be used by front end 172 to render graph 404.

Although the structured data 408 references framework 410, this is not a requirement of structured data. In some embodiments, the structured data can be in an arrangement that might be understandable by a variety of frameworks from which front end 172 can select.

FIG. 5 illustrates an example thread 500 showing a chart as the visual format in accordance with some aspects of the present technology. Thread 500 begins with prompt 502 requesting data regarding 'how rent prices changed in SF.' In response, generative response engine 140 has provided data sufficient for front end 172 to render completed response 504. Completed response 504 includes information tiles 506, chart 508, and text portion 512.

In this example, prompt 502 did not request a particular visual format to be provided as part of completed response 504. Rather the generative response engine 140 determined, based on its training, that a quality response would include portions of the response represented in a visual format. In this example, generative response engine 140 references a primitive effective to cause data to be displayed in information tile 506 and another primitive effective to cause other data to be displayed in chart 508.

As illustrated in FIG. 5, chart 508 can be interactive. In some embodiments, the framework used by front end 172 to render the structured data can create chart 508 as an interactive object that is capable of accepting inputs, responding to inputs by providing refreshed renderings of chart 508, and providing outputs interpretable by front end 172. In this example, chart 508 has received a user input 510 that is effective to interact with the interactive element in chart 508, and chart 508 has responded by highlighting the data selected by the user input 510.

FIG. 6 illustrates an example thread 600 showing a map with an information tile as the visual format in accordance with some aspects of the present technology. Thread 600 begins with prompt 602 requesting 'some great places to dine in Napa Valley during harvest.' In response, generative response engine 140 has provided data sufficient for front end 172 to render completed response 604. Completed response 604 includes text portion 606, map 608, and information tile 616.

In this example, prompt 602 did not request a particular visual format to provide as part of completed response 604. Rather generative response engine 140 determined, based on its training, that a quality response would include portions of the response represented in a visual format. In this example, generative response engine 140 referenced a primitive effective to render information about restaurants in Napa Valley in map 608 and another primitive effective to render information tile 616, which includes information about a restaurant selected in map 608.

As evidenced by the ability for a user to select an icon representing a restaurant in Napa Valley, map 608 is interactive. In some embodiments, the framework used by front end 172 to render the structured data can create map 608 and information tile 616 as an interactive object that is capable of accepting inputs, responding to inputs by providing refreshed renderings of map 608 and information tile 616, and providing outputs interpretable by front end 172. In some embodiments, outputs from a framework used to create map 608 can be provided as inputs to the framework used to create information tile 616, whereby a selection in map 608 is coordinated with information displayed in information tile 616.

Map 608 illustrates a user input 612 that is effective in selecting option 610, which represents the restaurant 'The French Laundry.' In response to the selection of selected option 610, front end 172 can cause information tile 616 to display a caption describing selected option 610. Map 608 also shows other option(s) 614 that are also selectable. Should the user select an alternative option, such as one of the other option(s) 614, information tile 616 can be updated with a description describing the selected other option.

FIG. 7 illustrates an example thread 700 showing a chart with an information tile as the visual format in accordance with some aspects of the present technology. Thread 700 begins with prompt 702 asking 'how has serve velocity changed over the years in men's pro tennis.' In response, generative response engine 140 has provided data sufficient for front end 172 to render completed response 704. Completed response 704 includes chart 706, information tile 708, and text portion 712.

Similar to FIG. 6, FIG. 7 illustrates that chart 706 is interactive and can receive user inputs such as user input 710, which is effective to interact with the interactive element, and information tile 708 can be updated in coordination with user input provided in chart 706 similar to the interaction between map 608 and information tile 616. For example, in FIG. 7, the user has provided a user input 710, which results in a highlight for the data pertaining to John Isner, and information tile 708 has been updated with a caption relevant to John Isner.

Figure 8B:
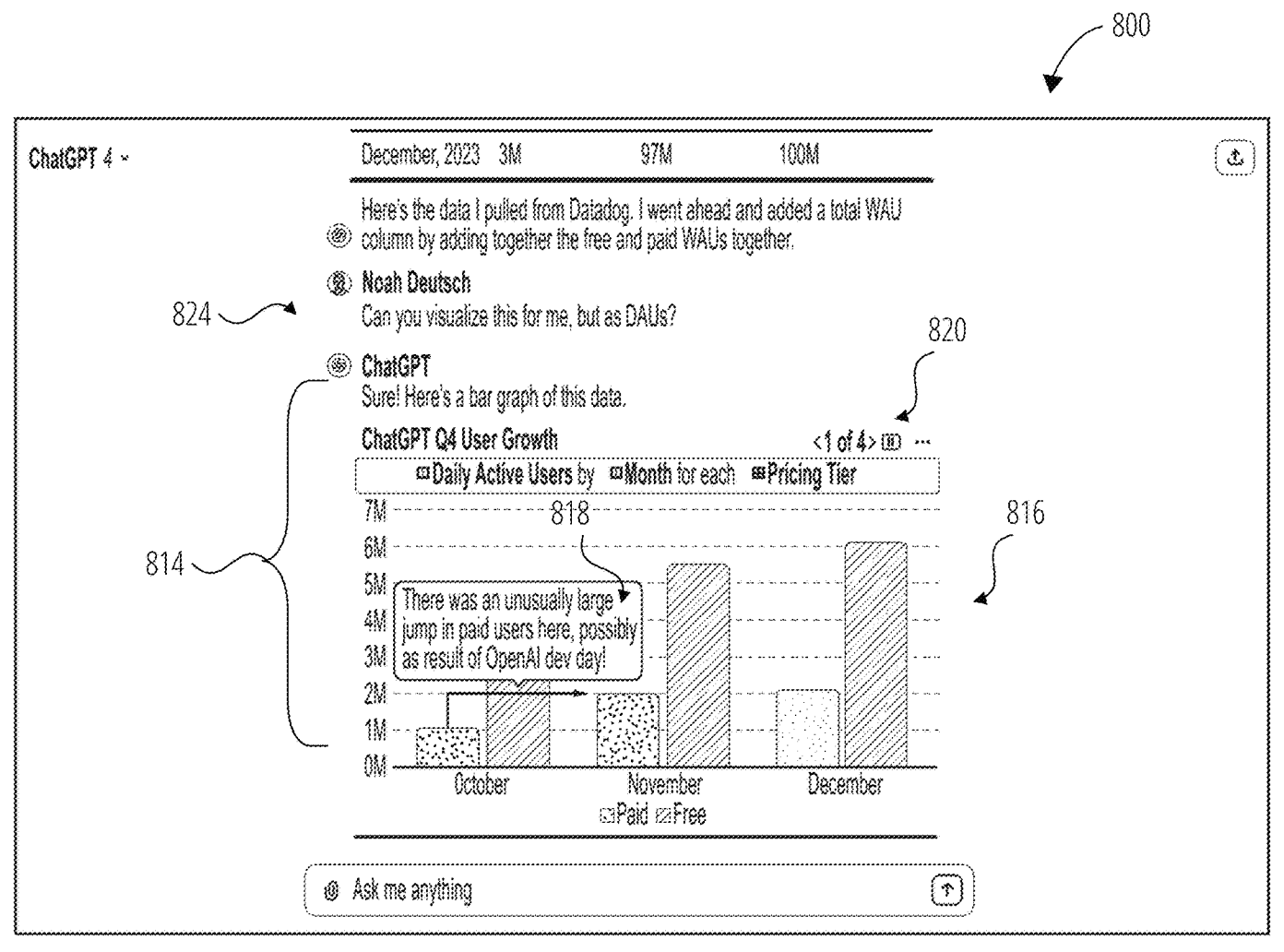
Figure 8C:
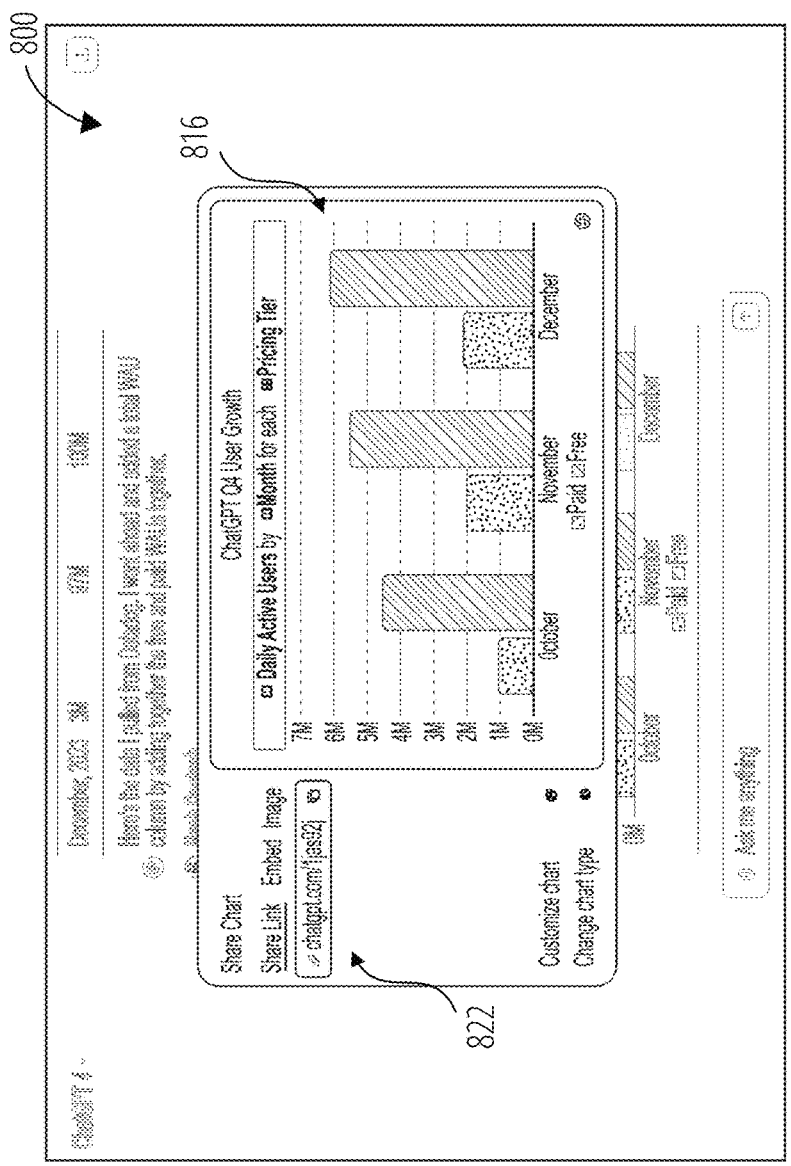
Figure 9:
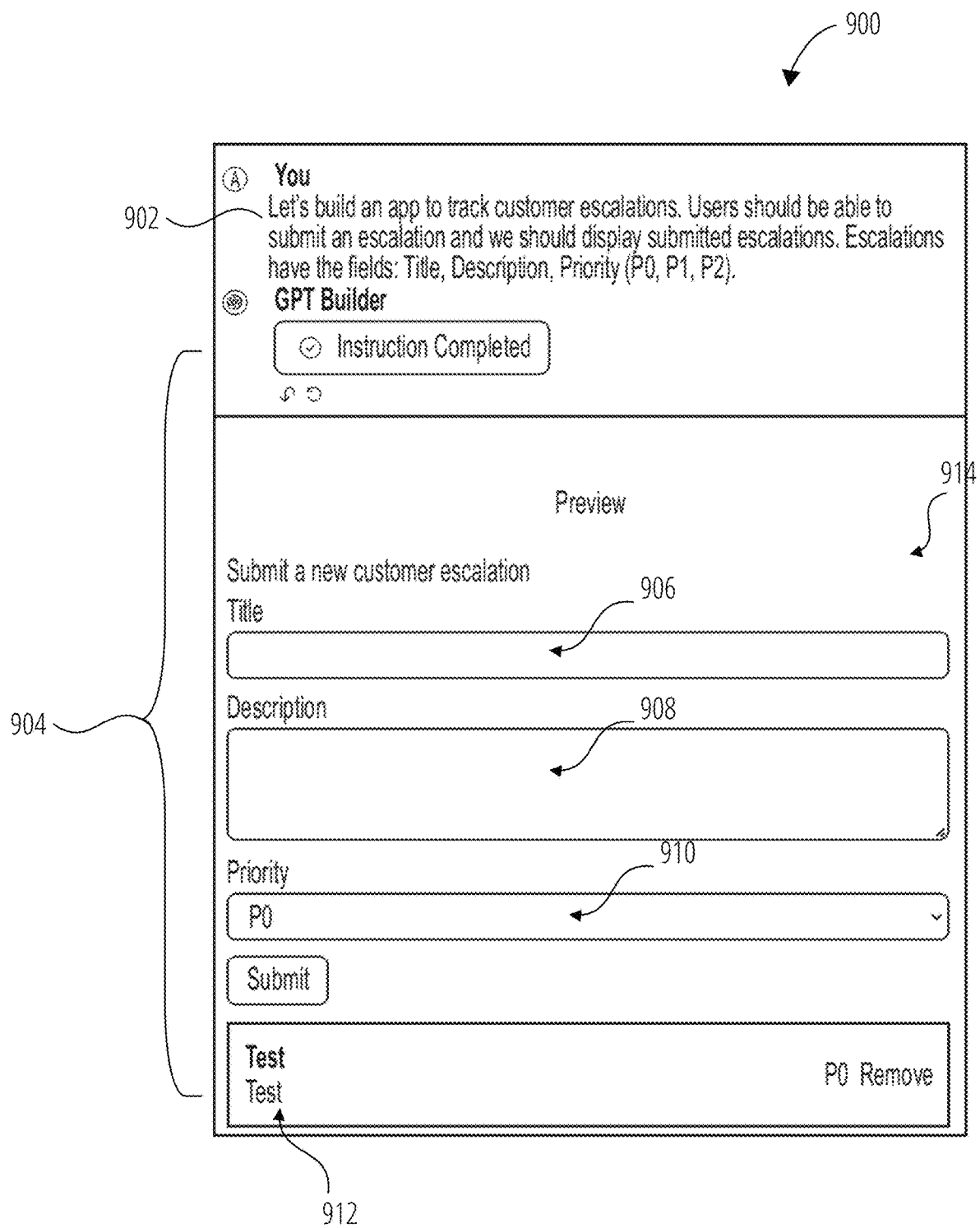
FIG. 9 illustrates an example thread showing an HTML application as the visual format in accordance with some aspects of the present technology.

FIG. 8A, FIG. 8B, and FIG. 8C illustrate an example interactive thread 800 in accordance with some aspects of the present technology. Interactive thread 800 begins with prompt 802 which includes files containing data and a written prompt requesting help understanding 'changes in ChatGPT usage in the fourth quarter.' It is implied in the prompt that the user account is requesting that the generative response engine 140 interpret data included in the files uploaded as part of prompt 802, and generative response engine 140 is sensitive to the implication.

Interactive thread 800 further includes completed response 804. Completed response 804 includes text portion 806 and table 808. In this example, prompt 802 did not request a particular visible format to be provided as part of completed response 804. Rather, generative response engine 140 determined, based on its training, that a quality response would include portions of the data represented in a visual format; in this example, generative response engine 140 referenced a primitive effective to render information derived from the files included in the prompt into table 808.

Table 808 includes data about weekly active users. In some embodiments, the framework used by front end 172 to render the structured data can create table 808 as an interactive object that is capable of accepting inputs, responding to inputs by providing refreshed renderings of table 808, and providing outputs interpretable by front end 172. As illustrated in FIG. 8A, table 808 has received the user input 810, which is effective in interacting with table 808. More specifically a user has provided user input to select a cell within table 808. Front end 172, using a framework to render the table, can respond by highlighting the selected cell, and providing further interactive options such as to copy the data or view the source of the data in the files provided with prompt 802.

Front end 172 is also able to identify which data is in the selected cell, and can copy a reference to the selected data in table 808 into prompt interface 812. Thereby, the user account can provide a further prompt which can reference the data selected in table 808. As illustrated in FIG. 8A the prompt entered in prompt interface 812 requests to learn 'what was this number in April.' The pronoun 'this' in the prompt can refer to the selected data in table 808, which can be understood by generative response engine 140. As illustrated in FIG. 8A, the front end 172 has not merely converted the data into the cell into text to be included in prompt interface 812. This mechanism is preferred because while the prompt refers to the number in the cell, the cell itself might carry additional context such as formulas and metadata that might be lost.

Accordingly, the prompt now includes a direct reference to the cell and the generative response engine can determine whether the number in the cell is important or other information relevant to the cell. More specifically, if the front end 172 were to have included the number selected in the table and revised the prompt, the prompt might say, "What was 2M in April?" which is not the question that is actually being asked. Instead, because the prompt is "What was this number in April?" while pointing to the cell in the table, the large language model can understand that the question is not actually about the number 2M, but instead, the question is about the number of weekly active users in April. The question can only be properly understood because the input received through the visual format was not translated to text such that the generative response engine has the full context of the reference to the table.

In some embodiments, the generative response engine 140 might only receive text as input, but the generative response engine 140 will receive a reference to the table, and the generative response engine will have access to the table as represented in text form through the structured data. In some embodiments, the generative response engine might also be able to receive the table in image format too so that the generative response engine 140 has both visual context and any underlying data and metadata represented in the structured data The interaction whereby front end 172 can reference selected data in the prompt interface 812 illustrates that more effective inputs can be provided to generative response engine 140 through interaction with data represented in visual formats. If the user account wanted to provide a prompt entirely in text that was to convey as much detail as the prompt in prompt interface 812, the user would need to provide a description of the cell showing paid weekly active users in October 2023 and asking generative response engine 140 to again refer to the uploaded files in prompt 802 to locate the number of paid weekly active users in April of 2023. In this example, while text can effectively convey the concept that is to be requested in the prompt in prompt interface 812, such interaction would be considered cumbersome. Furthermore, as the prompt in prompt interface 812 is merely an example, it can be appreciated that some concepts may be harder to articulate in text but may be easier to articulate with reference to data in a visual format.

FIG. 8B illustrates a continuation of interactive thread 800. As illustrated in FIG. 8B, generative response engine 140 has received an additional prompt, prompt 824, asking for a visualization of daily active users. Generative response engine 140 has provided a further response that is rendered by front end 172 as second response 814. Second response 814 includes chart 816 conveying the requested data. Chart 816 is also interactive. In this example, chart 816 is part of an animation or presentation that can be progressed through interaction with slide advance user interface object 820. Each animation or slide can further include one or more annotations such as annotation 818.

FIG. 8C illustrates chart 816 presented with a share link option 822 in accordance with some aspects of the present technology. In this example, generative response engine 140, in combination with front end 172, has created chart 816 that is useful enough that the user account may want to share it. Accordingly, one interaction provided by some data provided in the visual format maybe to copy and or share data presented in the visual format.

FIG. 9 illustrates an example thread 900 showing an HTML application as the visual format in accordance with some aspects of the present technology. Thread 900 illustrates prompt 902, which requests assistance in building an app to track customer escalations where users should be able to submit an escalation and display submitted escalations.

Thread 900 further shows completed response 904 which includes the requested HTML App 914. HTML App 914 includes a user interface with fields effective to receive inputs as requested in the prompt. HTML App 914 includes title field 906, description field 908, and priority field 910. Data entered into these fields can be recorded into a back-end database. Front end 172 has also rendered database view 912 where it is shown that information entered into priority field 910 has been recorded in the back-end database.

One difference worth highlighting between completed response 904 containing HTML App 914 as compared to some of the other visual formats part of completed responses in other figures is that HTML is significantly more versatile than formats that are limited to building a graph, a chart, a table, a map interface, etc. The amount of structure a primitive provides can be both beneficial and limiting. Additional structure, such as structure that limits what front end 172 can produce can be beneficial because it can be used to ensure the visual format is useful and provides a good user experience when included in a response. However, the additional structure can limit what might be possible to be provided in a completed response. HTML for example, can be used to create a wide range of outputs, and it may be difficult to ensure that those outputs are useful and provide a good user experience.

In some embodiments, when generative response engine 140 provides data having somewhat less structure, it may be beneficial to provide additional training to generative response engine 140 to be able to evaluate whether its response is of sufficient quality-just as generative response engine 140 already receives such training with respect to text output.

When generative response engine 140 provides a response including HTML, the use of a primitive may or may not be needed. On the one hand, the generative response engine 140 can output HTML code since HTML code is ultimately textual output. On the one hand, some users may provide somewhat incomplete prompts which might lead to too much variability in possible outputs. Therefore, the decision of whether to utilize a primitive when providing HTML output maybe tied to the ultimate objective of the HTML output. For example, generative response engine 140 may have access to one or more primitives that are specific to particular types of HTML projects. Such projects, if they are well defined, may benefit from the information in the form of system prompts that can be used to ensure that any user-provided prompt provides sufficient detail to result in a high-quality response. For example, if a prompt were to request a simple HTML website, such a defined task may benefit from a primitive that defines certain styles to be utilized or avoided (e.g., the minimum font sizes and font color-background color combinations to be avoided, etc.) in order to provide a nice looking website, or may define questions that the generative response engine 140 might ask the user account to gain additional details helpful in preparing a useful response.

Figure 10:
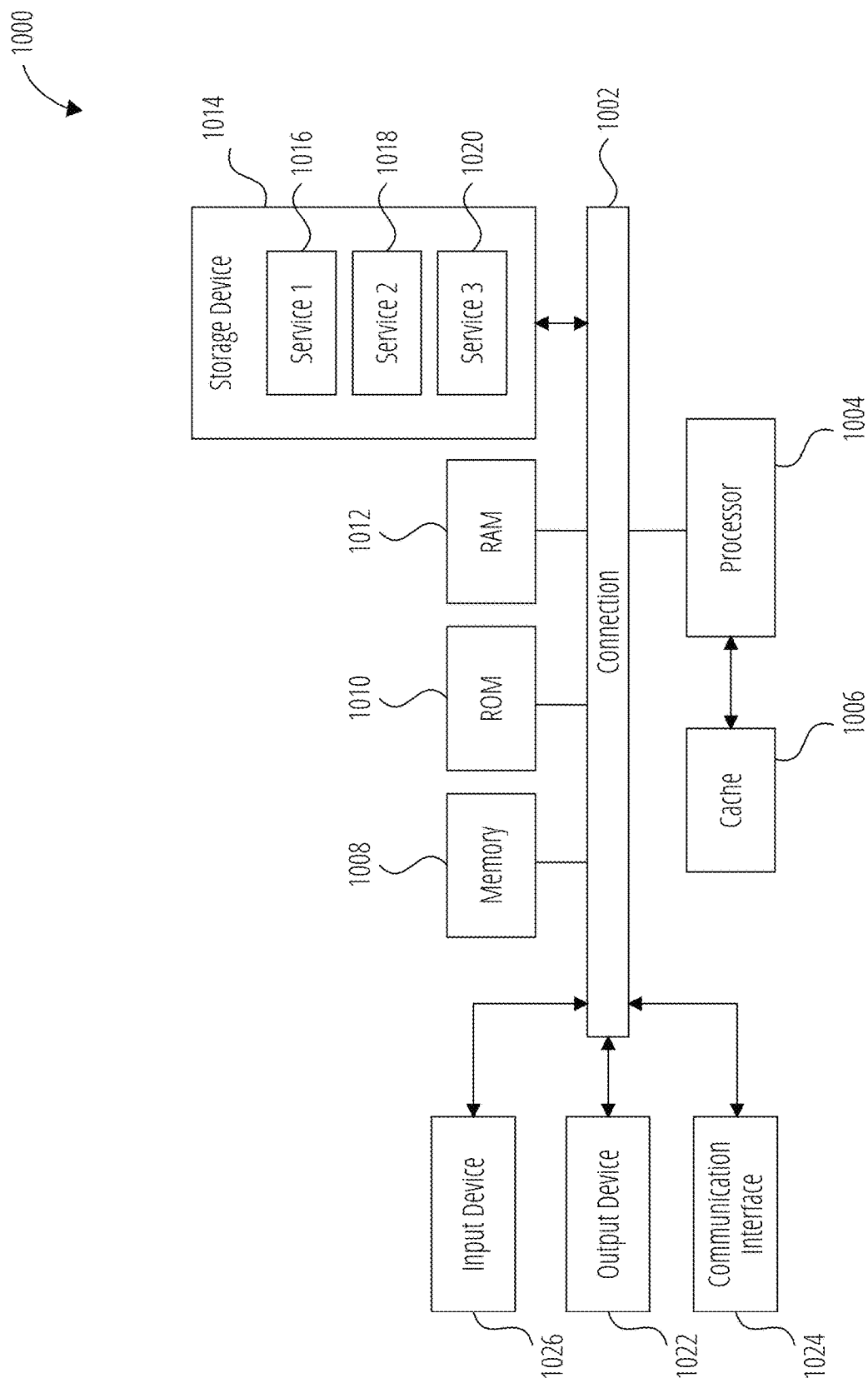
FIG. 10 shows an example of a system for implementing certain aspects of the present technology.

FIG. 10 shows an example of computing system 1000, which can be, for example, any computing device making up any engine illustrated in FIG. 1 or any component thereof in which the components of the system are in communication with each other using connection 1002. Connection 1002 can be a physical connection via a bus, or a direct connection into processor 1004, such as in a chipset architecture. Connection 1002 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 1000 includes at least one processing unit (CPU or processor) 1004 and connection 1002 that couples various system components including system memory 1008, such as read-only memory (ROM) 1010 and random access memory (RAM) 1012 to processor 1004. Computing system 1000 can include a cache of high-speed memory 1006 connected directly with, in close proximity to, or integrated as part of processor 1004.

Processor 1004 can include any general purpose processor and a hardware service or software service, such as services 1016, 1018, and 1020 stored in storage device 1014, configured to control processor 1004 as well as a special-purpose processor where software instructions are incorporated into the actual processor design. Processor 1004 may essentially be a completely self-contained computing system, containing multiple cores or processors, a bus, memory controller, cache, etc. A multi-core processor may be symmetric or asymmetric.

To enable user interaction, computing system 1000 includes an input device 1026, which can represent any number of input mechanisms, such as a microphone for speech, a touch-sensitive screen for gesture or graphical input, keyboard, mouse, motion input, speech, etc. Computing system 1000 can also include output device 1022, which can be one or more of a number of output mechanisms known to those of skill in the art. In some instances, multimodal systems can enable a user to provide multiple types of input/output to communicate with computing system 1000. Computing system 1000 can include communication interface 1024, which can generally govern and manage the user input and system output. There is no restriction on operating on any particular hardware arrangement, and therefore the basic features here may easily be substituted for improved hardware or firmware arrangements as they are developed.

Storage device 1014 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1014 can include software services, servers, services, etc., that when the code that defines such software is executed by the processor 1004, it causes the system to perform a function. In some embodiments, a hardware service that performs a particular function can include the software component stored in a computer-readable medium in connection with the necessary hardware components, such as processor 1004, connection 1002, output device 1022, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspects:

The present technology includes computer-readable storage mediums for storing instructions for, and systems for executing, any one of the methods addressed in the aspects of the present technology presented below:

Aspect 1. A method comprising: receiving, by a generative response engine, a first prompt to generate a response, wherein the generative response engine has been trained to determine when the response should utilize a first primitive from a collection of primitives to generate the response, wherein the first primitive causes the generative response engine to output an initial response that includes structured data as defined by the first primitive; invoking, by the generative response engine, the first primitive; generating, by the generative response engine, the initial response that includes the structured data as defined by the first primitive and text; rendering the structured data in a visual format using a front end; outputting a completed response, the completed response including the rendered structured data in the visual format and the text.

Aspect 2. The method of Aspect 1, wherein the structured data is provided in JavaScript Object Notation (JSON).

Aspect 3. The method of any one of Aspects 1-2, further comprising: receiving, by the generative response engine, a second prompt, wherein the second prompt includes a reference to the structured data; generating, a second response based on the structured data and that is responsive to the second prompt.

Aspect 4. The method of any one of Aspects 1-3, wherein the second prompt requests a change to the display of the visual format of the structured data.

Aspect 5. The method of any one of Aspects 1-4, wherein the second prompt requests an interpretation of the structure data or a conclusion drawn from the structured data.

Aspect 6. The method of any one of Aspects 1-5, wherein the visual format includes an interactive element, the method further comprising: receiving an input that is effective to interact with the interactive element; re-rendering the interactive element in response to the received input.

Aspect 7. The method of any one of Aspects 1-6, further comprising: presenting a sharing UI object with the rendered structured data in the visual format; receiving a selection of the sharing UI object that is effective to share the rendered structured data in the visual format as a discrete object separate from a thread in which the structured data is presented.

Aspect 8. The method of any one of Aspects 1-7, wherein the input that is effective to interact with the interactive element is an edit input, the edit input being effective to directly edit the visual format or the structured data.

Aspect 9. The method of any one of Aspects 1-8, wherein the first primitive defines a data format useable to create a table, wherein the generative response engine can generate the structured data in the data format useable to create the table, wherein the front end generates the table from the structured data.

Aspect 10. The method of any one of Aspects 1-9, wherein the first primitive defines a data format useable to create at least one information tile, wherein the data format useable to create the at least one information tile segregates portions of the structured data into segments corresponding to individual information tiles of the at least one information tile, wherein the generative response engine can generate the structured data in the format useable to create the at least one information tile, wherein the front end generates the at least one information tile.

Aspect 11. The method of any one of Aspects 1-10, wherein the first primitive includes a template system prompt to generate an HTML object, an image, or an application to be included with the initial output, wherein the generative response engine generates code for the HTML object or application, wherein the front end renders the code for the HTML object or application as the visual format wherein the input that is effective to interact with the interactive element is an edit input, the edit input being effective to directly edit the visual format or the structured data.

Aspect 12. The method of any one of Aspects 1-11, wherein at least a portion of the first prompt includes information conveyed through inputs received by a visual format input object, wherein the visual format input object is other than a text input, or file/image upload interface, wherein the visual format input objects include at least one of a color picker, date/time pickers, numeric steppers, range selectors, validated forms, rating inputs, switches, slides, multi-select dropdowns, radio button groups, checkbox groups, cascading dropdowns (dropdowns that change their content based on the selection made in another dropdown) maps, folder structures, drag and drop lists, etc.

What is claimed is:

1. A method comprising:
receiving, by a language model generative response engine, a first prompt in natural language to generate a response within a chat thread between a user account and the language model generative response engine presented by a front end, wherein the language model generative response engine has been trained to determine when the response should utilize a first primitive from a collection of primitives to generate the response, wherein the first primitive causes the language model generative response engine to output an initial response that includes structured data as defined by the first primitive;
invoking, by the language model generative response engine, the first primitive;
generating, by the language model generative response engine, the initial response by predicting a next word in a sequence of words based on the first prompt and the first primitive to result in the initial response made up of the sequence of words arranged as the structured data defined by the first primitive;
rendering the initial response as the structured data in a visual format using the front end;
outputting a completed response, the completed response including the rendered structured data in the visual format.

2. The method of claim 1, wherein at least a portion of the first prompt includes information conveyed through inputs received by a visual format input object.

3. The method of claim 1, further comprising:
receiving, by the generative response engine, a second prompt, wherein the second prompt is a combination of a selected portion of the rendered structured data and natural language that instructs the generative response engine to interpret the selected portion of the rendered structured data or draw a conclusion from the selected portion of the rendered structured data;
generating, a second response based on the structured data and that is responsive to the second prompt.

4. The method of claim 1, wherein the visual format includes an interactive element, the method further comprising:
receiving an input that is effective to interact with the interactive element;
re-rendering the structured data in the visual format in response to the received input.

5. The method of claim 4, wherein the input that is effective to interact with the interactive element is an edit input, the edit input being effective to directly edit the visual format or the structured data.

6. The method of claim 1, further comprising:
presenting a sharing UI object with the rendered structured data in the visual format;
receiving a selection of the sharing UI object that is effective to share the rendered structured data in the visual format as a discrete object separate from a thread in which the structured data is presented.

7. The method of claim 1, wherein the first primitive defines a data format useable to create a table, wherein the generative response engine can generate the structured data in the data format useable to create the table, wherein the front end generates the table from the structured data.

8. The method of claim 1, wherein the first primitive defines a data format useable to create at least one information tile, wherein the data format useable to create the at least one information tile segregates portions of the structured data into segments corresponding to individual information tiles of the at least one information tile, wherein the generative response engine can generate the structured data in the format useable to create the at least one information tile, wherein the front end generates the at least one information tile.

9. The method of claim 1, wherein the first primitive includes a template system prompt to generate an HTML object, an image, or an application to be included with the initial output, wherein the generative response engine generates code for the HTML object or application, wherein the front end renders the code for the HTML object or application as the visual format.

10. The method of claim 1, wherein the completed response is generated by the generative response engine and does not require a specialized artificial intelligence knowledge source.

11. A computing system comprising:
at least one processor; and
a memory storing instructions that, when executed by the at least one processor, configure the system to:
receive, by a generative response engine, a first prompt in natural language to generate a response, wherein the generative response engine has been trained to determine when the response should utilize a first primitive from a collection of primitives to generate the response, wherein the first primitive causes the generative response engine to output an initial response that includes structured data as defined by the first primitive;
invoke, by the generative response engine, the first primitive;
generate, by the generative response engine, the initial response by predicting a next word in a sequence of words based on the first prompt and the first primitive to result in the initial response made up of the sequence of words arranged as the structured data defined by the first primitive;
render the initial response as the structured data in a visual format using the front end;
output a completed response, the completed response including the rendered structured data in the visual format.

12. The computing system of claim 11, wherein at least a portion of the first prompt includes information conveyed through inputs received by a visual format input object.

13. The computing system of claim 11, wherein the instructions further configure the system to:
receive, by the generative response engine, a second prompt, wherein the second prompt is a combination of a selected portion of the rendered structured data and natural language that instructs the generative response engine to interpret the selected portion of the rendered structured data or draw a conclusion from the selected portion of the rendered structured data;
generate, a second response based on the structured data and that is responsive to the second prompt.

14. The computing system of claim 11, wherein the visual format includes an interactive element, wherein the instructions further configure the system to:
receive an input that is effective to interact with the interactive element;
re-render the structured data in the visual format in response to the received input.

15. The computing system of claim 11, wherein the instructions further configure the system to:
- present a sharing UI object with the rendered structured data in the visual format;
- receive a selection of the sharing UI object that is effective to share the rendered structured data in the visual format as a discrete object separate from a thread in which the structured data is presented.

16. A non-transitory computer-readable storage medium, the computer-readable storage medium including instructions that when executed by at least one processor, cause the at least one processor to:
- receive, by a single-platform generative response engine, a first prompt in natural language to generate a response, wherein the single-platform generative response engine has been trained to determine when the response should utilize a first primitive from a collection of primitives to generate the response, wherein the first primitive causes the single-platform generative response engine to output an initial response that includes structured data as defined by the first primitive;
- invoke, by the single-platform generative response engine, the first primitive;
- generate, by the single-platform generative response engine, the initial response by predicting a next word in a sequence of words based on the first prompt and the first primitive to result in the initial response made up of the sequence of words arranged as the structured data defined by the first primitive;
- render the initial response as the structured data in a visual format using a front end;
- output a completed response, the completed response including the rendered structured data in the visual format.

17. The computer-readable storage medium of claim 16, wherein at least a portion of the first prompt includes information conveyed through inputs received by a visual format input object.

18. The computer-readable storage medium of claim 16, wherein the instructions further configure the at least one processor to:
- receive, by the single-platform generative response engine, a second prompt, wherein the second prompt is a combination of a selected portion of the rendered structured data and natural language that instructs the single-platform generative response engine to interpret the selected portion of the rendered structured data or draw a conclusion from the selected portion of the rendered structured data;
- generate, a second response based on the structured data and that is responsive to the second prompt.

19. The computer-readable storage medium of claim 16, wherein the visual format includes an interactive element, wherein the instructions further configure the at least one processor to:
- receive an input that is effective to interact with the interactive element;
- re-render the structured data in the visual format in response to the received input.

20. The computer-readable storage medium of claim 19, wherein the input that is effective to interact with the interactive element is an edit input, the edit input being effective to directly edit the visual format or the structured data.

21. The computer-readable storage medium of claim 16, wherein the instructions further configure the at least one processor to:
- present a sharing UI object with the rendered structured data in the visual format;
- receive a selection of the sharing UI object that is effective to share the rendered structured data in the visual format as a discrete object separate from a thread in which the structured data is presented.

* * * * *